United States Patent [19]
Kojima et al.

[11] Patent Number: 5,682,281
[45] Date of Patent: Oct. 28, 1997

[54] MAGNETIC DISK DRIVER CAPABLE OF PREVENTING OCCURRENCE OF A DATA ERROR RESULTING FROM STATIC ELECTRICITY

[75] Inventors: Osamu Kojima; Yoshihiro Okuyama; Hisateru Komatsu, all of Tendo, Japan

[73] Assignee: Mitsumi Electric Co., Ltd., Tokyo, Japan

[21] Appl. No.: 704,271

[22] Filed: Aug. 28, 1996

[30] Foreign Application Priority Data

Aug. 31, 1995 [JP] Japan .................. 7-222972

[51] Int. Cl.[6] .................. G11B 17/02; G11B 5/55; G11B 21/08
[52] U.S. Cl. .................. 360/106; 360/97.01
[58] Field of Search .................. 360/106, 97.01–99.12

[56] References Cited

U.S. PATENT DOCUMENTS 4,870,703  9/1989  Augeri et al. .................. 360/98.07
5,142,425  8/1992  Gailbreath, Jr. et al. .................. 360/123
5,289,213  2/1994  Murai et al. .................. 346/140 R
5,585,981  12/1996  Lee .................. 360/106

FOREIGN PATENT DOCUMENTS 49-17423  4/1974  Japan .

*Primary Examiner*—Robert S. Tupper
*Attorney, Agent, or Firm*—Frishauf, Holtz, Goodman, Langer & Chick

[57] ABSTRACT

A flexible printed wiring board (29-1) is brought into contact with an insulating tape (31-1) attached onto an internal wall of an upper case (30) with the movement of a head carriage (25). The flexible printed wiring board (29-1) is coated with an antistatic agent (50) to prevent occurrence of static electricity resulting from frictional contact between the flexible printed wiring board (29-1) and the insulating tape (31-1).

6 Claims, 3 Drawing Sheets

MAGNETIC DISK DRIVER CAPABLE OF PREVENTING OCCURRENCE OF A DATA ERROR RESULTING FROM STATIC ELECTRICITY

BACKGROUND OF THE INVENTION

This invention relates to a magnetic disk driver for carrying out data write/read operations to and from a magnetic disk and, in particular, to an improvement of a structure around a head carriage of a magnetic disk driver.

A magnetic disk driver of the type described comprises a magnetic head for carrying out data write/read operations to and from a magnetic disk, a head carriage holding the magnetic head to be movable with respect to the magnetic disk in a predetermined radial direction, a driving unit for moving the head carriage in the predetermined radial direction, and a printed wiring board mounting various electric circuits including a driving unit control circuit and a signal processing circuit. The magnetic head, the head carriage, the driving unit, and the printed wiring board are accommodated in a metal case. In the data write/read operations, the magnetic head is moved together with the head carriage. The magnetic head and preselected sites on the printed wiring board are electrically connected through a flexible printed wiring board which has printed wiring patterns and which is freely deformable.

A, the magnetic disk driver of the type described is required to be small in size. This imposes the restriction on the size of the metal case. Therefore, upon movement of the magnetic head, the flexible printed wiring board must be deformed within a restricted narrow space and is inevitably brought into contact with an internal wall of the metal case. As will later become clear, the contact between the flexible printed wiring board and the internal wall of the metal case is a face contact. This means that the surface of the flexible printed wiring board is rubbed by the internal wall of the metal case during the movement of the magnetic head. Through repetition of such movement, the surface of the flexible printed wiring board will be worn or damaged. This often results in occurrence of a short circuit in the printed wiring patterns formed on the flexible printed wiring board.

Taking the above into consideration, an insulating tape is attached onto the internal wall of the metal case at a portion to be brought into contact with the flexible printed wiring board. The insulating tape serves to protect the flexible printed wiring board from such harmful rubbing by the metal case and to thereby prevent the above-mentioned occurrence of short circuit resulting from wear. However, frictional contact between the flexible printed wiring board and the insulating tape often causes static electricity to easily occur. The static electricity intrudes into the printed wiring patterns on the flexible printed wiring board as a noise. As a result, a data error is caused to occur in read/write data read and written by the magnetic head to deteriorate an error rate.

SUMMARY OF THE INVENTION

It is therefore an object of this invention to provide a magnetic disk driver which is capable of avoiding occurrence of static electricity even if a flexible printed wiring board and a metal case or an insulator tape attached thereto are brought into frictional contact with each other within the metal case.

A magnetic disk driver to which this invention is applicable comprises a magnetic head for carrying out data write/read operations to and from a magnetic disk, a head carriage holding the magnetic head to be movable with respect to the magnetic disk in a predetermined radial direction, a driving unit for moving the head carriage in the predetermined radial direction, and a printed wiring board with electric circuits mounted thereon. The magnetic head, the head carriage, the driving units, and the printed wiring board are accommodated in a metal case. The magnetic head and preselected sites on the printed wiring board are electrically connected through a flexible printed wiring board which has printed wiring patterns and which is freely deformable.

According to an aspect of this invention, the flexible printed wiring board has a contact surface to be brought into contact with an internal wall of the metal case. The area of the contact surface varies with the movement of the head carriage. An antistatic agent is applied onto at least one of the contact surface of flexible printed wiring board and the contacted internal wall of the metal case.

DESCRIPTION OF THE PREFERRED EMBODIMENT

Figure 1:
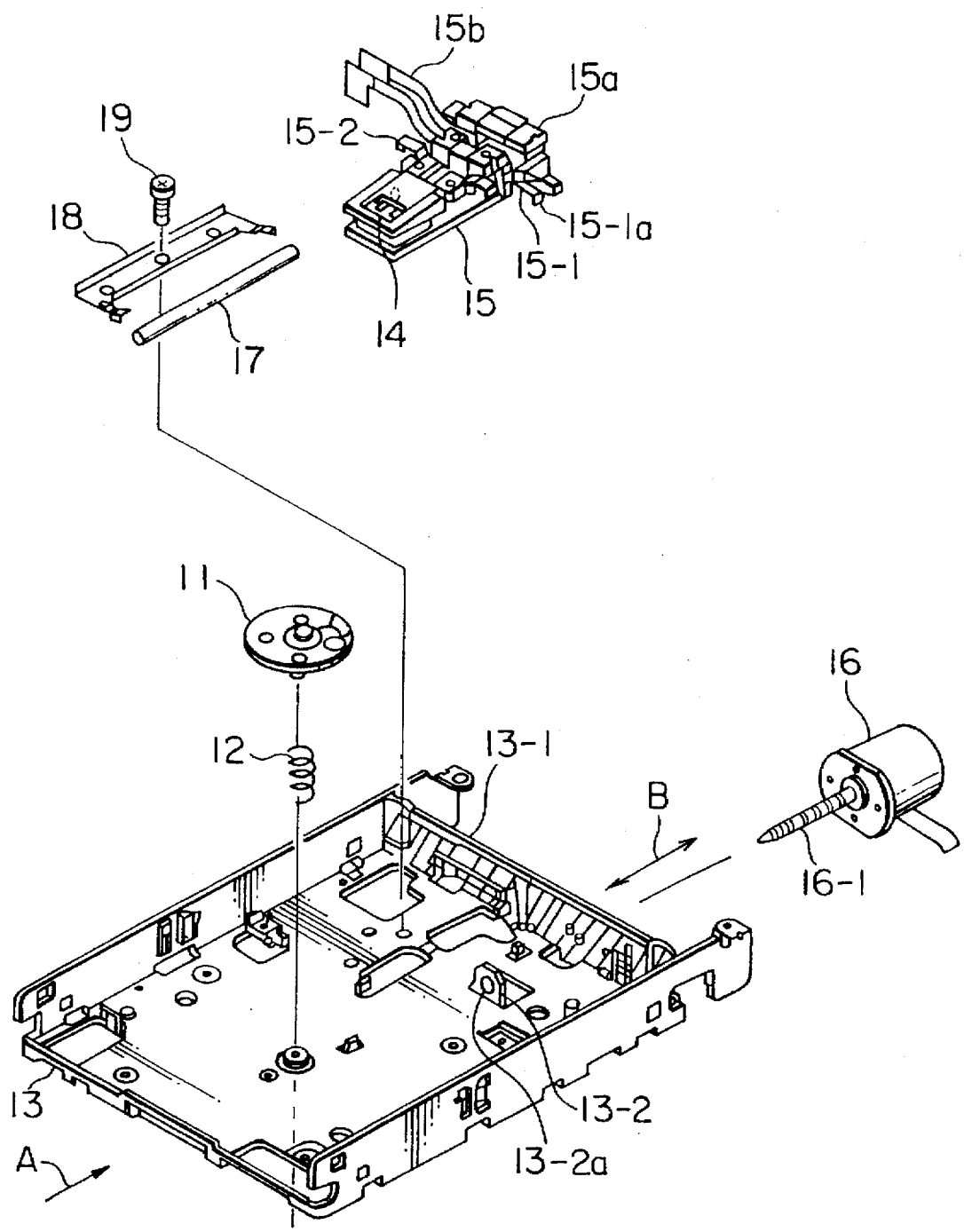
FIG. 1 is an exploded perspective view of a conventional magnetic disk driver.

Referring to FIG. 1, description will be made as regards the structure around a head carriage in a conventional magnetic disk driver in order to facilitate an understanding of this invention. The magnetic disk driver is a device for driving a magnetic disk (not shown), such as a flexible disk, to carry out data write/read operations to and from the magnetic disk. The magnetic disk is inserted into the magnetic disk driver in a direction depicted by an arrow A in FIG. 1. The magnetic disk thus inserted is held by a disk table assembly 11 with their center axes coincident with each other. The disk table assembly 11 is rotatably supported through a spring 12 on the upside surface of a frame 13 forming a part of a case. The disk table assembly 11 is rotated by a motor (not shown) located on the underside surface of the frame 13 to thereby rotate the magnetic disk. Typically, on the underside surface of the frame 13, a printed wiring board (not shown) is attached with a number of electronic parts forming a control circuit, a signal processing circuit, and the like mounted thereon.

The magnetic disk driver includes a magnetic head 14 for carrying out the data write/read operations to and from the magnetic disk. The magnetic head 14 is held by a head carriage 15. The head carriage 15 is located above the upside surface of the frame 13 apart from the frame 13 as will later be described. The head carriage 15 holds the magnetic head 14 to be movable with respect to the magnetic disk in a predetermined radial direction (depicted by an arrow B in FIG. 1).

The frame 13 has a rear wall 13-1 to which a stepping motor 16 is fixed. The stepping motor 16 is for driving the head carriage 15 in the predetermined radial direction B. More in detail, the stepping motor 16 has a rotation shaft (driving shaft) 16-1 extending in parallel to the predetermined radial direction B. A male or external thread is formed on the rotation shaft 16-1. The rotation shaft 16-1 has a top end rotatably supported by a hole 13-2a formed in a bending portion 13-2 of the frame 13. The bending portion 13-2 is formed by cutting and raising a part of the frame 13. The hole 13-2a serves to restrain the rotation shaft 16-1 so that the rotation shaft 16-1 extends in parallel to the predetermined radial direction B.

On the other hand, the head carriage 15 has an arm 15-1 extending from a head carriage body 15a to the rotation shaft 16-1. The arm 15-1 has a top end provided with a hook portion 15-1a which is bent into a shape adapted to be engaged with a root of the male thread formed on the rotation shaft 16-1. With this structure, when the rotation shaft 16-1 of the stepping motor 16 is rotated, the hook portion 15-1a of the arm 15-1 is moved by the root of the male thread on the rotation shaft 16-1. As a consequence, the whole of the head carriage 15 is moved in the predetermined radial direction B.

The rotation shaft 16-1 of the stepping motor 16 is formed at one side of the head carriage 15. Thus, the head carriage 15 is movably supported apart from the frame 13 by the rotation shaft 16-1 at the one side. However, with the above-mentioned support by the rotation shaft 16-1 alone, the whole of the head carriage 15 can not be located in position apart from the upside surface of the frame 13. Accordingly, a guide member is required to support and guide the head carriage 15 at the other side of the head carriage 15. The guide member is implemented by a guide bar 17.

The guide bar 17 is formed at the other side of the head carriage 15 opposite to the rotation shaft 16-1 of the stepping motor 16. The guide bar 17 extends in parallel to the predetermined radial direction B and has both ends fixed to the upside surface of the frame 13. A hook portion 15-2 formed on the head carriage 15 is engaged with the guide bar 17 so that the head carriage 15 is guided along the predetermined radial direction B. In this manner, the whole of the head carriage 15 is located apart from the upside surface of the frame 13. Electrical connection between the printed wiring board (not shown) and the magnetic head 14 is performed by a flexible printed wiring board 15b. The guide bar 17 is supported by a guide bar clamp 18 on the upside surface of the frame 13. The guide bar clamp 18 is fixed by a bolt 19 to the frame 13.

Figure 2:
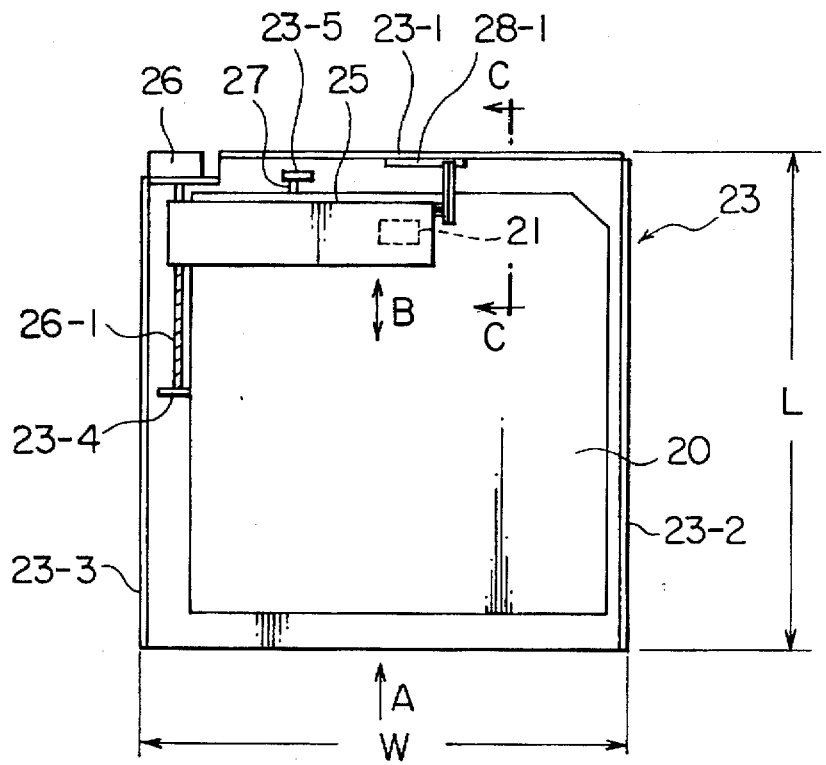
FIG. 2 is a schematic plan view of an interior of another conventional magnetic disk driver of a miniatuarized type.

In recent years, there is an increasing demand for miniatuarization of a magnetic disk driver. FIG. 2 schematically shows an example of the magnetic disk driver designed to meet such a demand for miniatuarization. In the illustrated example, a frame 13 including a rear wall 23-1 and right and left side walls 23-2 and 23-3 has a width W slightly greater than that of a magnetic disk 20. Preferably, the length L of the frame 23 is as nearly equal to that of the magnetic disk 20 as possible. Trial is also made to minimize a size (thickness) of the magnetic disk driver in a vertical direction.

Referring to FIG. 2, the frame 23 has the width W and the length L both of which are slightly (+10 mm at most) greater than those of the magnetic disk 20. The magnetic disk 20 is inserted into a magnetic disk body in a direction depicted by an arrow A in FIG. 2. A stepping motor 26 is fixed to a part of the rear wall 23-1 of the frame 23 at a position adjacent to the left side wall 23-3. The stepping motor 26 has a rotation shaft 26-1. The rotation shaft 26-1 has a top end rotatably supported by a bending portion 23-4 formed on the frame 23. The rotation shaft 26-1 is engaged with a part of a head carriage 25 with a magnetic head 21 mounted thereon. As a result, the head carriage 25 is driven by the rotation of the rotation shaft 26-1 to move in a predetermined radial direction B of the magnetic disk 20 in the manner similar to the example illustrated in FIG. 1. The details will later be described. The frame 23 has two support portions (only one being depicted at 23-5 in the figure) each of which is formed by cutting and raising a part of the frame 23. These two support portions serve to fixedly hold a guide bar 27 (only a part being shown in the figure) to extend in parallel to the rotation shaft 26-1.

When the thickness is reduced in addition to the above-mentioned reduction in width and length, another problem arises which will hereafter be described.

Figure 3:
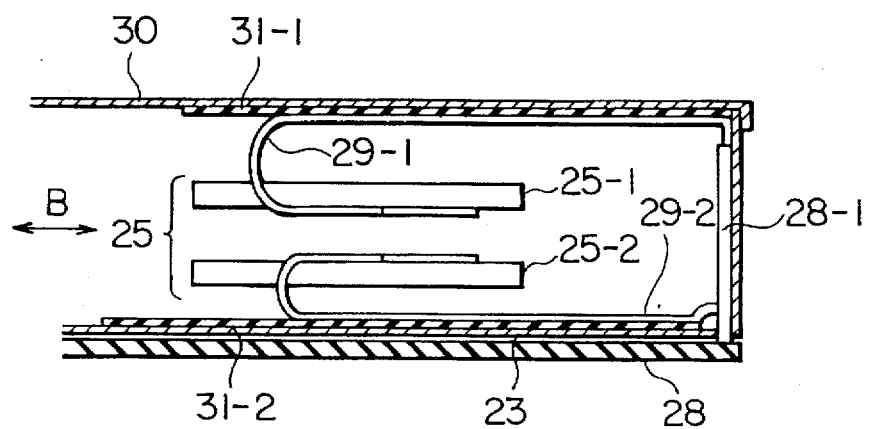
FIG. 3 is a sectional view taken along a line C—C in FIG. 2 for describing the relationship between a conventional head carriage and a surrounding structure.

FIG. 3 is a sectional view taken along a line C—C in FIG. 2 and shows flexible printed wiring boards 29-1 and 29-2 for connecting the magnetic head 21 (FIG. 2) formed on the head carriage 25 and preselected sites on a printed wiring board 28. The head carriage 25 has an upper carriage 25-1 and a lower carriage 25-2. The flexible printed wiring board 29-1 is similar to the above-mentioned flexible printed wiring board 15b in that one end is fixed to the underside surface of the upper carriage 25-1 while the other end is inserted into a terminal plate 28-1 formed on the printed wiring board 28 for electrical connection. However, the flexible printed wiring board 15b illustrated in FIG. 1 is perpendicular to a principal surface of the frame 13. On the other hand, the flexible printed wiring board 29-1 illustrated in FIG. 3 is arranged in parallel to the principal surface of the frame 23. With the movement of the head carriage 25 in the direction B in the figure, the flexible printed wiring board 29-1 is deformed so that its curved portion is shifted in the same direction. Thus, the movement of the head carriage 25 is neither prevented nor inhibited by the flexible printed wiring board 29-1. The above description also applies to the flexible printed wiring board 29-2 for the lower carriage 25-2.

The above-mentioned structure is particularly effective in reducing the thickness of the magnetic disk driver. However, the flexible printed wiring board 29-1 is inevitably brought into contact with an upper metal case 30 formed at an upper portion of the frame 23. Accordingly, an insulating tape 31-1 is attached to an internal wall of the upper case 30 at a portion to be brought into contact with the flexible printed wiring board 29-1 so as to prevent the flexible printed wiring board 29-1 from being worn due to rubbing by the upper case 30 and resultant occurrence of short circuit in wiring patterns formed on the flexible printed wiring board 29-1.

However, when the flexible printed wiring board 29-1 is brought into frictional contact with the insulating tape 31-1, static electricity is easily caused to occur. The static electricity intrudes into the wiring patterns on the flexible printed wiring board 29-1 as a noise. This results in occurrence of a data error in read/write data read and written by the magnetic head and deterioration of an error rate. This also applies to the lower flexible printed wiring board 29-2 and an insulator tape 31-2 attached thereto.

Now, description will be made as regards a preferred embodiment of this invention with reference to FIGS. 4 and 5. Preferably, this invention is applied to a magnetic disk driver of a miniatuarized type as illustrated in FIG. 2. The similar parts are designated by like reference numerals as those illustrated in FIGS. 2 and 3.

Figure 4:
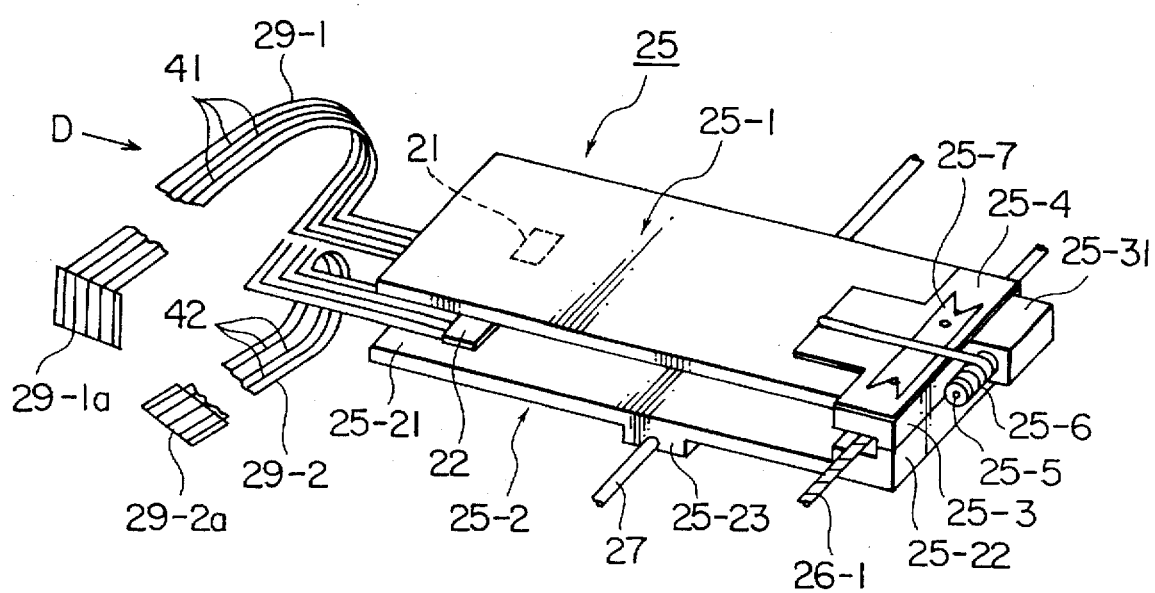
FIG. 4 is a perspective view of a head carriage and a surrounding structure in a magnetic disk driver to which this invention is applicable.

Referring to FIG. 4, description will be made as to the relationship of a head carriage 25 to which this invention is applicable, a rotation shaft 26-1 of a stepping motor (not shown), and a guide bar 27. The head carriage 25 has an upper carriage 25-1 and a lower carriage 25-2. The upper carriage 25-1 and the lower carriage 25-2 have one ends to which magnetic heads 21 and 22 are attached, respectively. The upper carriage 25-1 can be opened upwards in the figure with the other end as a support. A magnetic disk which is not shown in the figure is inserted between the upper and the lower carriages 25-1 and 25-2 while the upper carriage 25-1 is opened. After the magnetic disk is inserted, the upper carriage 25-1 is closed as illustrated in the figure so that the magnetic heads 21 and 22 are located adjacent to the magnetic disk.

The upper carriage 25-1 comprises a flat plate 25-11. On the other hand, the lower carriage 25-2 comprises a flat plate 25-21 supporting the magnetic head 22 and a protruding portion 25-22 formed at the other end opposite to the one end provided with the magnetic head 22. The protruding portion 25-22 is combined with a supporting block 25-3. The supporting block 25-3 is connected to the upper carriage 25-1 through a flexible coupling plate 25-4 made of metal. The supporting block 25-3 is fixed together with the protruding portion 25-22 and has a spring attaching portion 25-31 projecting in a rightward direction in FIG. 4. A spring supporting portion 25-5 of a round rod shape projects from the spring attaching portion 25-31 in a forward direction in the figure. A spring 25-6 is attached to the spring supporting portion 25-5 to urge the upper carriage 25-1 in a downward direction in the figure. The coupling plate 25-4 is fixed by a backup plate 25-7 attached to the top surface of the supporting block 25-3 through two bolts (not shown).

The upper carriage 25-1 is adapted to be opened upwards, before insertion of the magnetic disk, by the movement of a disk holder plate (not shown). When the magnetic disk is inserted, the disk holder plate is moved down. As a result, the upper carriage 25-1 is urged by the spring 25-6 to be moved downwards and closed so that the magnetic head 21 is placed adjacent to the magnetic disk. Thereafter, when the magnetic disk is ejected, the upper carriage 25-1 is kept opened by the disk holder plate which is now moved upwards.

The protruding portion 25-22 and the supporting block 25-3 are arranged so that a space is formed therebetween. In this space, a rotation shaft 26-1 with a thread formed thereon is inserted. In addition, a metal member (not shown) engaged with a root of the thread on the rotation shaft 26-1 is provided within the space. Thus, the head carriage 25 is driven by the rotation of the rotation shaft 26-1 to be moved in its axial direction in the manner similar to the head carriage 15 described in conjunction with FIG. 1.

At an intermediate portion of the lower carriage 25-2, a protruding portion 25-23 is formed in parallel to the rotation shaft 26-1. The protruding portion 25-23 is provided with a throughhole. A guide bar 27 is inserted into the throughhole. With this structure, the guide bar 27 guides the movement of the head carriage 25. The frame 23 is provided with a punch hole in correspondence to a moving range of the protruding portion 25-23 so as to prevent the protruding portion 25-23 from being brought into contact with the frame 23 (FIG. 3) and from inhibiting the movement of the head carriage 25. Such punch hole also serves to prevent an increase of the thickness of the magnetic disk driver due to presence of the protruding portion 25-23.

To the top ends of the underside surface of the upper carriage 25-1 and the upside surface of the lower carriage 25-2, one ends of the flexible printed wirings boards 29-1 and 29-2 are connected, respectively, as described in conjunction with FIG. 3. The upper flexible printed wiring board 29-1 is protruded from the top end of the upper carriage 25-1, turned in a perpendicular direction, bent upwards, and reversed to be directed towards a terminal plate 28-1 (FIG. 3). The lower flexible printed wiring board 29-2 is protruded from the top end of the lower carriage 25-2, turned in a perpendicular direction, bent downwards, and reversed to be directed towards the terminal plate. As well known, these flexible printed wiring boards 29-1 and 29-2 comprise flexible material substrates on which a plurality of line conductor patterns 41 and 42 are formed in parallel. The conductor patterns 41 and 42 are coated with a transparent resin material. With this structure, the flexible printed wiring boards 29-1 and 29-2 are deformable in surface plane. The flexible printed wiring boards 29-1 and 29-2 have the other ends provided with plug portions 29-1a and 29-2a, respectively. The plug portions 29-1a and 29-2a are adapted to be inserted into receptacles (not shown) of the terminal plate 28-1 (FIG. 3) for electrical connection therebetween.

Figure 5:
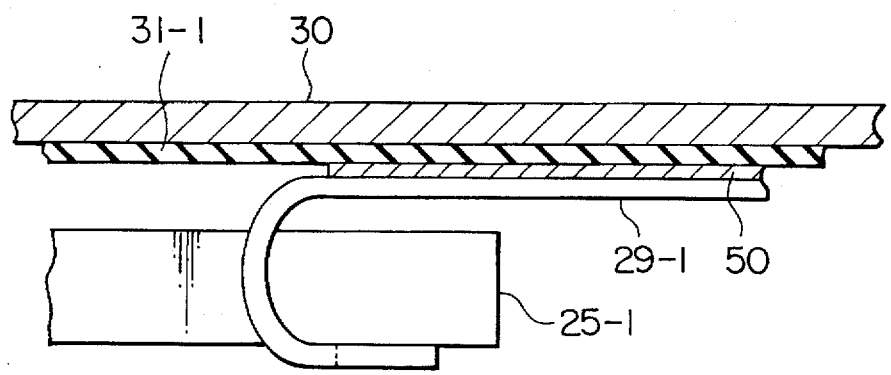
FIG. 5 is a partial sectional view of a main portion of the magnetic disk driver according to this invention, as seen from a direction depicted by an arrow D in FIG. 4.

Referring to FIG. 5, an insulating tape 31-1 is attached to an internal wall of the upper case 30 at a portion to be brought into contact with the upper flexible printed wiring board 29-1. An antistatic agent 50 is applied onto the flexible printed wiring board 29-1 at a site to be brought into contact with the insulating tape 31-1. Although not illustrated in the figure, the antistatic agent is similarly applied onto the lower flexible printed wiring board 29-2 at a site to be brought into contact with an insulating tape 31-2 (FIG. 3) attached to the internal wall of the frame 23. The antistatic agent 50 is made of a nonconductive viscous material, for example, produced by partial hydrolysis of tetraalkoxytitanium represented by a general formula $Ti(RO)_4$ (R representing an alkyl group $C_nH_{2n+1}$ in which the number n of carbon atoms is between 2 and 10). Such material is disclosed in Japanese Patent Publication No. 17423/1974. Alternatively, use may be made of a kind of grease which is readily available. Use may also be made of an antistatic agent of the type typically used in a polyvinyl variable condenser.

In any event, the antistatic agent 50 is interposed between the flexible printed wiring board 29-1 and the insulating tape 31-1 and between the flexible printed wiring board 29-2 and the insulating tape 31-2 (see FIG. 3) and serves to help smooth contact therebetween, thereby preventing occurrence of static electricity. It will be understood that the antistatic agent 50 may be applied onto the insulating tapes 31-1 and 31-2. Since the antistatic agent 50 is made of a nonconductive material and can perform a role of the insulating tapes 31-1 and 31-2. Thus, depending on the circumstances, the insulating tapes 31-1 and 31-2 may be omitted.

As described above, according to this invention, it is possible to prevent occurrence of static electricity resulting from frictional contact between the flexible printed wiring board formed in a movable portion and any of the metal case, the frame or the insulating tape adhered thereto. Accordingly, it is possible to prevent deterioration of the error rate in the read/write operations resulting from static electricity.

What is claimed is:

1. A magnetic disk driver comprising a magnetic head for carrying out data write/read operations to and from a magnetic disk, a head carriage holding said magnetic head to be movable with respect to said magnetic disk in a predetermined radial direction, a driving unit for moving said head carriage in said predetermined radial direction, and a printed wiring board with electric circuits mounted thereon, said magnetic head, said head carriage, said driving unit, and said printed wiring board being accommodated in a metal case, said magnetic head and preselected sites on said printed wiring board being electrically connected through a flexible printed wiring board which has printed wiring patterns and which is freely deformable, wherein:

said flexible printed wiring board has a contact surface to be brought into contact with an internal wall of said case, an area of said contact surface varying with the movement of said head carriage, and an antistatic agent is applied onto at least one of said contact surface of said flexible printed wiring board and the contacted internal wall of said case.

2. A magnetic disk driver as claimed in claim 1, further an insulating tape attached onto the internal wall of said case at a portion to be brought into contact with said flexible printed wiring board, said insulating tape being coated with the antistatic agent.

3. A magnetic disk driver as claimed in claim 1, wherein said antistatic agent is made of a nonconductive viscous material.

4. A disk driver as claimed in claim 3, wherein said antistatic agent is made of a material produced by partial hydrolysis of tetraalkoxytitanium represented by a general formula $Ti(RO)_4$ (R representing an alkyl group $C_nH_{2n+1}$ in which the number n of carbon atoms is between 2 and 10).

5. A magnetic disk driver as claimed in claim 2, wherein said antistatic agent is made of a nonconductive viscous material.

6. A disk driver as claimed in claim 5, wherein said antistatic agent is made of a material produced by partial hydrolysis of tetraalkoxytitanium represented by a general formula $Ti(RO)_4$ (R representing an alkyl group $C_nH_{2n+1}$ in which the number n of carbon atoms is between 2 and 10).

* * * * *